D. R. RUPERT.
AGRICULTURAL IMPLEMENT.
APPLICATION FILED JAN. 28, 1915.

1,174,899.

Patented Mar. 7, 1916.
2 SHEETS—SHEET 1.

Witnesses
E. H. Wagner
A. R. Whittington

Inventor
D. R. Rupert
By Robb & Robb
Attorneys

D. R. RUPERT.
AGRICULTURAL IMPLEMENT.
APPLICATION FILED JAN. 28, 1915.
1,174,899.
Patented Mar. 7, 1916.
2 SHEETS—SHEET 2.
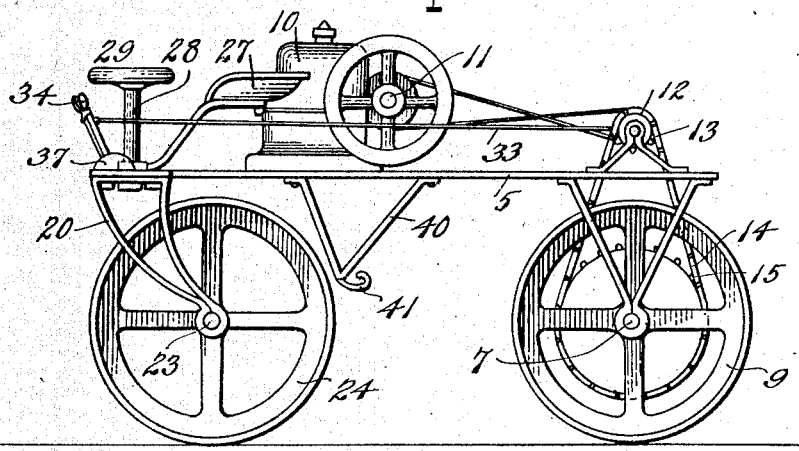
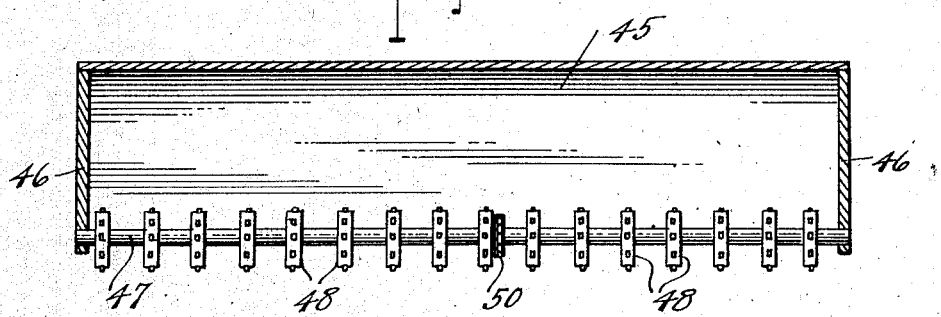
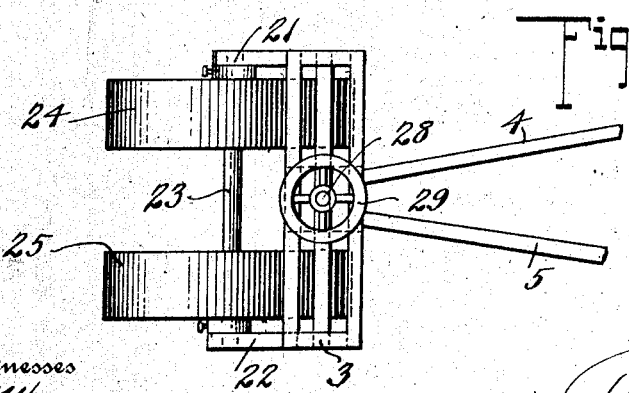
Inventor
D. R. Rupert

UNITED STATES PATENT OFFICE.

DEMUS R. RUPERT, OF ROANOKE, INDIANA.

AGRICULTURAL IMPLEMENT.

1,174,899.      Specification of Letters Patent.      Patented Mar. 7, 1916.

Application filed January 28, 1915. Serial No. 4,873.

*To all whom it may concern:*

Be it known that I, DEMUS R. RUPERT, a citizen of the United States, residing at Roanoke, in the county of Huntington and State of Indiana, have invented certain new and useful Improvements in Agricultural Implements, of which the following is a specification.

This invention relates to an agricultural implement, and more particularly to a combined roller, seeder and cultivator which is propelled by an internal combustion engine.

The primary object of this invention is to provide an agricultural implement embodying front and rear rollers, which are propelled by any suitable type of internal combustion engine, so as to permit of the rolling of a field of growing grain, when the soil of the field is soft, thereby eliminating the tearing up of the field and uprooting of the grain by the travel of horses' feet thereover.

Another object of this invention is to construct a supporting frame for an agricultural implement as specified, which may have detachably connected thereto, a harrow of ordinary construction, positioned rearwardly of a front roller which is of increased length with respect to the rear roller and also to provide a seeding attachment for sowing broadcast grass seed, oats or like grain and rolling and harrowing at the same time immediately after the seed has been planted to compact the ground upon the seed.

A still further object of this invention is to provide a frame as specified, wherein the rear roller is composed of two sections adjustable laterally of each other for spacing to permit of the cultivation and rolling of corn or like grain which is planted in rows.

A still further object of the invention is to pivotally support the rear rollers and supporting frame therefor, so that the same may be turned inwardly under the supporting structure of the implement for reversing the direction of travel thereof if it is so desired.

With the foregoing and other objects in view this invention consists in such novel features of construction, combination and arrangement of parts as will be hereinafter more fully described, illustrated in the accompanying drawings and claimed.

Figure 1:
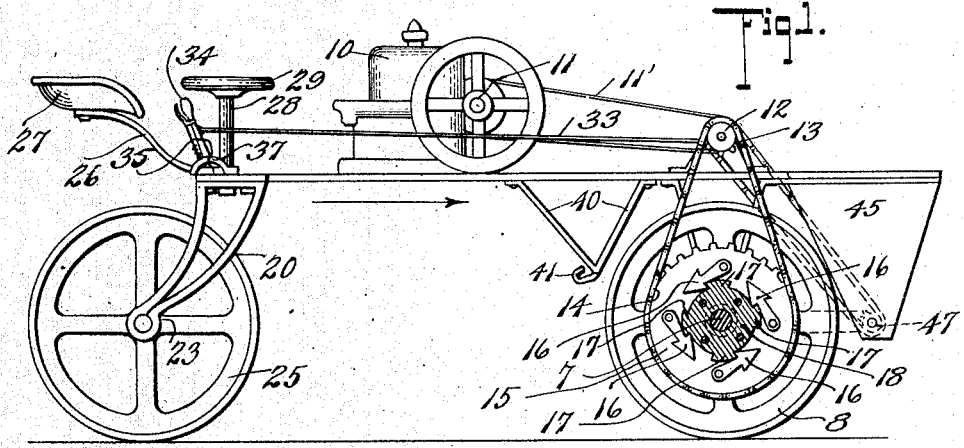
Figure 2:
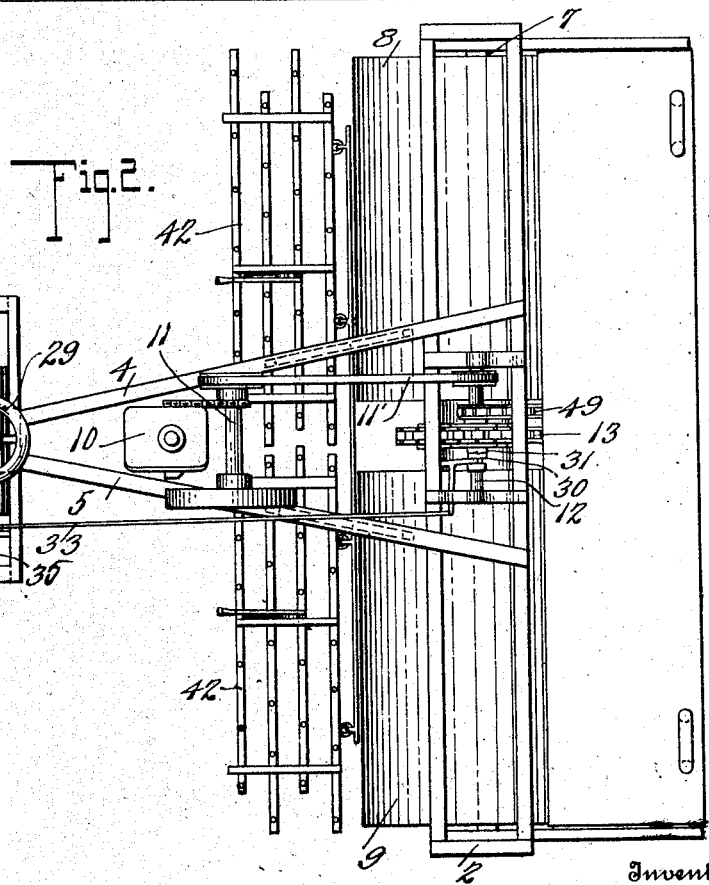

In describing the invention in detail reference will be had to the accompanying drawings wherein like characters designate like or corresponding parts throughout the several views, and in which:

Figure 1 is a view in side elevation, partially in plan and partially in section of the improved agricultural implement showing the seeding attachment applied thereto. Fig. 2 is a top plan view of the implement showing a harrow attached and also the seeding device attached forwardly of the front roller. Fig. 3 is a side elevation of the implement showing the rear rollers turned beneath the supporting frame. Fig. 4 is a sectional view through the seeding mechanism; and Fig. 5 is a top plan view of the rear rollers showing them spaced from each other.

Referring more particularly to the drawings, 1 designates the supporting structure of the agricultural implement, which comprises substantially a pair of rectangular frames 2 and 3 which are joined by converging rails 4 and 5. The forward rectangular frame 2 is of greater length than the rear frame 3 and it has secured thereto at spaced intervals along its length depending brackets 6, which rotatably support an axle 7. The front axle 7 has rollers 8 and 9 loosely mounted thereupon for rotation upon the axle, which rollers are rotated by a prime mover illustrated in the drawings at 10 as an ordinary gasolene or internal combustion engine. The power shaft 11 of the engine 10 is operatively connected to a shaft 12 by means of a belt or similar power transmitting member 11' and said shaft has a sprocket wheel 13 mounted thereupon. A sprocket chain 14 passes about the sprocket wheel 13 and about a sprocket 15, which is loosely carried by the axle 7, which provides for the rotation of the rollers carried thereby.

As shown most clearly in Fig. 1 of the drawings, the driving sprocket 15 carries a plurality of gravitative pawls 16 having arrow-shaped extremities which are adapted to engage the peripheral projections 17 which are formed upon the hub projections 18 attached to the adjacent ends of the driving rollers 8 and 9. This arrangement forms an interlocking connection between the driving sprocket 15 and rollers and allows for a differential movement of the rollers in turning. The especial advantage of the foregoing locking arrangement lies in the fact that the pawls 16 upon a reversal of the direction of travel of the implement will automatically turn on their pivots and engage with the opposite sides of the projection 17, thereby locking the rollers with the drive upon reversal of the latter. The pawls, it will be apparent, are assisted in their reversing action by impingement of the projections 17 thereagainst as the roller hubs are rotated in the reverse direction.

The rear end of the supporting frame, upon which the substantially rectangular frame 3 is attached, has a bracket 20 swively supported therebeneath, said bracket having depending arms 21 and 22 shaped so as to form bearings for the rear axle 23 of the implement. The rear axle 23 has rollers 24 and 25 mounted thereupon, for longitudinal sliding movement upon the shaft for spacing the rollers apart from each other as shown in Fig. 5, when it is desired to use the device for the cultivation of corn or like grain. The bracket 20 has a spring standard 26 fixedly carried thereby and positioned upon the upper surface of the supporting frame 1, said standard supporting a seat 27 of the ordinary construction. The seat 27 and the standard 26 which supports the same moves synchronously with the movement of the bracket 20, so that the seat will always be facing the direction of travel of the rollers 24 and 25 and consequently of the agricultural implement. A steering post 28 is also fixedly connected to the bracket 20 and has a steering wheel 29 formed thereupon, which steering wheel is positioned forwardly of the seat 27, and is provided for swiveled movement of the bracket 20 for guiding the direction of travel of the implement.

The shaft 12 has a clutch segment 30 feathered thereupon, which is provided for coaction with a clutch segment 31 carried by the sprocket 12, for throwing the device into or out of operative position. An angled or bell crank lever 32 is connected to the feathered clutch segment 30 and has a rod 33 connected thereto which extends rearwardly along the upper surface of the frame 1 and is connected to a hand lever 34. The hand lever 34 is pivotally carried by the frame 1 as shown at 35 and it has a dog mechanism carried thereby which coacts with a quadrant 37 for holding the lever 34 in various adjusted positions. The lever 34 is positioned for convenient access by the person seated upon the seat 27 and is provided for moving the rod 33 for throwing the machine into or out of gear.

The supporting structure 1 has secured to the under surface thereof and rearwardly of the front rollers 8 and 9 depending reversible brackets 40. The brackets 40 have a plurality of hooks 41 carried by the lower edge thereof. Each bracket 40 is composed of a pair of bars which are secured to the under surface of the structure 1 and extend downwardly therefrom, converging and having their lower ends connected, to which connected ends the hooks 41 are attached. In Fig. 2 of the drawings an ordinary sectional harrow 42 is shown attached to the supporting frame 1.

In Figs. 1 and 2 of the drawings, a seeding device 45 is attached to the supporting structure 1 and forwardly of the front rollers 8 and 9. The seeding construction 45 comprises a hopper 46, which is substantially frusto-pyramidally shaped, having a shaft 47 extending longitudinally through its lower end. The shaft 47 has a plurality of spreading wheels 48 mounted thereupon, which are provided for scattering or spreading the seed, such as clover seeds, oats or the like, broadcast over a field, after which the seeds are rolled in by the rollers 8 and 9 and harrowed by the harrow 42, if it is so desired. The shaft 47 is rotated by the rotation of the shaft 12 through the medium of a sprocket chain 49, which travels about a sprocket 50 which is mounted upon the shaft 47, as shown in Fig. 4 of the drawings.

In Fig. 3 of the drawings the bracket 20 is shown reversed, positioning the rollers 24 and 25 beneath the supporting frame 1, at which time they may be spaced from each other as is clearly shown in Fig. 5, to permit of the passage of a row of corn between the rollers. The rollers 8 and 9 are always spaced sufficiently wide apart to permit of their passing upon opposite sides of the row of corn or other growing grain. In this view the brackets 40 are shown reversed, and secured to the supporting structure 1 immediately behind the rollers 24 and 25, at which position they are provided for supporting a cultivator structure. The reversal of the brackets is accomplished by detaching one side of each and rotating it about the opposite attached side as an axis until the reversed position is reached when the detached side is again secured to the frame 1 as shown in Fig. 3.

The prime mover or internal combustion engine 10 is detachably mounted upon the supporting structure 1, so that if it is so desired the same may be removed from the agricultural implement and employed for other purposes.

From the foregoing description and the appended drawings, in connection with the explanation now to be made, the advantages of the construction and combination of this implement will be clearly understood. Agriculturalists at the present time find that it is desirable in the sowing of certain seeds to follow a particular method, which method depends somewhat upon climatic, soil and other conditions. That is to say, under certain circumstances it has been found desirable to sow, for instance clover seed, broadcast followed immediately with a rolling of such seed into the soil and subsequently harrowing said soil to present a proper surface which will not be likely to become baked or incrusted, preventing the seed from properly sprouting through the surface. Again this order of seeding is reversed, that is, the soil should preferably be harrowed, rolled and then the seed sown upon the rolled surface which may be treated at an entirely separate and distinct operation if it becomes necessary. Therefore I have arranged a combination of instrumentalities which will advantageously perform either of the two orders of seeding and to accomplish which it is only necessary to reverse the direction of travel of the implement. This does not require any change in the details of construction but only a proper direction of movement of the implement as a unit. The special instrumentalities accomplish the full operation of seeding at a single time instead of requiring three separate and distinct operations as is usually incidental to the sowing of seeds of this character.

It will be apparent that slight changes may be made in the details of construction of the device without departing from the spirit of the invention and within the scope of the claims hereto appended.

Having thus described the invention, what is claimed is:—

1. In an agricultural implement, the combination of a supporting frame, a roller supporting said frame at one end, shiftable steering means supporting the frame at its other end and including a roller movable in one direction of travel toward the first mentioned roller and away from the latter in the other direction of travel, and harrow attaching means mounted on said frame intermediate said rollers and adjustable toward or from the first mentioned roller according to the direction of travel of the machine.

2. In an agricultural implement, the combination of a supporting frame, a roller supporting said frame at one end, a steering roller, a yoke bracket pivotally connected to the frame and in which the steering roller is mounted, said steering roller being movable to swing under the frame in one direction of travel and outwardly away from the frame in the other direction of travel, and a bracket detachably connected to the frame intermediate the rollers aforesaid for adjustment with relation to the steering roller according to its disposition above mentioned with respect to the frame.

3. In an agricultural implement, the combination of a supporting frame, spaced rollers supporting said frame at one end, adjustable rollers on which the frame is mounted at its other end, and normally disposed in contiguous relation to each other in line with the space between the spaced rollers, said adjustable rollers being movable to provide a space therebetween corresponding to that between the spaced rollers aforesaid.

4. In an agricultural implement, the combination of a supporting frame, spaced rollers supporting said frame at one end, steering means at the other end of said frame including adjustable rollers, an axle for said adjustable rollers, and means on said axle for holding the rollers at adjusted positions on the axle aforesaid.

5. In an agricultural implement of the class described, the combination of a supporting frame, a driving roller carrying said frame, an axle therefor, driving means for said roller, a steering roller having swiveled connection with the frame for reversal upon reverse movement of the implement, and automatically reversible locking members intermediate the driving means and said driving roller for maintaining interlocked connection between these parts in either direction of travel of the said machine.

6. In an agricultural implement of the class described, the combination of a supporting frame, a driving roller carrying said frame, an axle upon which said roller is loosely mounted, a driving member loosely mounted on said axle, means for actuating said driving member, and swinging pawls carried by said driving member and adapted to interlock with the driving roller, said pawls being automatically movable to reverse positions upon reversal of the driving member whereby to maintain an interlocking connection intermediate said driving member and the driving roller in either direction of the movement of the implement.

7. In an agricultural implement of the class described, the combination of a supporting frame, an axle carried by the said frame, a driving roller loosely mounted on said axle and having a hub formed thereon and provided with a plurality of projections, a driving sprocket loosely mounted on the axle adjacent to the hub aforesaid, pawls pivotally secured to said driving sprocket and having reversible engaging heads adapted to interlock with the projections on said hub, said pawls being automatically shiftable upon reverse movement of the roller hub, the projections of said hub being adapted to impinge the pawls to cause the shifting thereof as aforesaid.

8. In an agricultural implement of the class described, the combination of driving rollers, steering rollers spaced therefrom, a frame supported by said rollers, a swiveled bracket for said steering rollers connected to the frame, said bracket being curved in formation to permit of reversal of said steering roller according to the direction of travel of the implement, harrow attaching means intermediate the driving rollers and the steering roller comprising a depending bracket detachably secured to the frame, said bracket being movable about one side as an axis for connection with the frame when the steering roller is reversed.

In testimony whereof I affix my signature in presence of two witnesses.

DEMUS R. RUPERT.

Witnesses:
JOHN H. YORK,
ELNORA G. YORK.